(12) United States Patent
Groos et al.

(10) Patent No.: US 6,781,081 B2
(45) Date of Patent: Aug. 24, 2004

(54) WIRE ELECTRODE FOR SPARK EROSION CUTTING

(75) Inventors: Heinrich Groos, Herborn (DE); Bernd Barthel, Herborn (DE); Tobias Noethe, Herborn (DE); Christoph Dietrich, Herborn (DE)

(73) Assignee: Berkenhoff GmbH, Heuchelheim (DE)

( * ) Notice: Subject to any disclaimer, the term of this patent is extended or adjusted under 35 U.S.C. 154(b) by 0 days.

(21) Appl. No.: 10/243,119

(22) Filed: Sep. 13, 2002

(65) Prior Publication Data

US 2003/0057189 A1 Mar. 27, 2003

(30) Foreign Application Priority Data

Sep. 21, 2001 (EP) .............................................. 01122798

(51) Int. Cl.$^7$ ................................................ B23K 1/00
(52) U.S. Cl. .................................. 219/69.12; 219/69.15
(58) Field of Search ........................... 219/69.12, 69.11, 219/69.15, 69.17

(56) References Cited

U.S. PATENT DOCUMENTS

| | | | |
|---|---|---|---|
| 4,686,153 A | * | 8/1987 | Tominaga et al. .......... 428/610 |
| 5,196,665 A | | 3/1993 | Briffod |
| 5,762,726 A | * | 6/1998 | Barthel et al. .............. 148/518 |
| 5,945,010 A | | 8/1999 | Tomalin |
| 6,448,527 B1 | * | 9/2002 | Barthel et al. ........... 219/69.15 |

FOREIGN PATENT DOCUMENTS

| | | |
|---|---|---|
| DE | 195 10 740 | 10/1996 |
| DE | 199 13 694 | 11/2000 |
| EP | 0 312 674 | 4/1989 |
| JP | 05 337 741 | 12/1993 |

* cited by examiner

Primary Examiner—M. Alexandra Elve
(74) Attorney, Agent, or Firm—Flynn, Thiel, Boutell & Tanis, P.C.

(57) ABSTRACT

A wire electrode for spark erosion cutting of metals, electrically-conducting ceramics etc., comprising either a homogenous centre (1) made of a metal or of a metal alloy, or a composite centre made from a steel core with a coating of copper or copper alloy, wherein the wire electrode comprises at least two sheath coatings made of zinc alloys, with said coatings wearing during erosion. In order to increase performance during high-speed cutting, such a wire electrode comprises an inner sheath coating (2) predominantly comprising β-brass, and an outer sheath coating (3) predominantly comprising γ-brass, wherein the fraction of β/β'-phase or γ-phase in the two sheath coatings is at least 60%. The ratio of the coating thickness of β-brass to γ-brass is between 0.3 and 7. The sum of the thicknesses of both sheath coatings in relation to the external diameter of the electrode is between 0.1 and 0.3.

10 Claims, 3 Drawing Sheets

Figure 1:
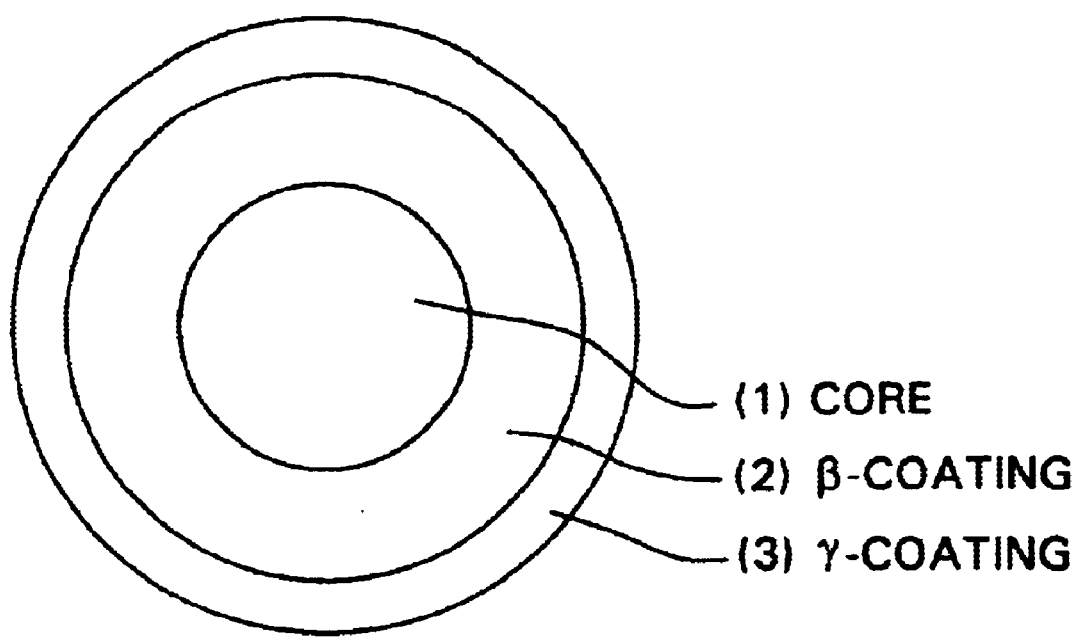

WORKPIECE MATERIAL: X210Cr12
WORKPIECE HEIGHT: 50 mm
WIRE DIAMETER: 0.3 mm
WIRE RUN-OFF SPEED: 12 m/min

WIRE ELECTRODE FOR SPARK EROSION CUTTING

The invention relates to a wire electrode for spark erosion cutting of metals, electrically-conducting ceramics etc., comprising either a homogenous centre made of a metal or of a metal alloy, or a composite centre and comprising at least two sheath coatings made of Zn alloys, with said coatings wearing during erosion.

In the development of wire electrodes for spark erosion cutting of metals or other electrically-conducting bodies it has been proven advantageous if a sheathed electrode is used in which the centre not only provides the necessary strength but also the electrical conductivity, wherein the actual erosion process is carried out by a sheath coating which comprises pure zinc or a zinc alloy. While a pure coating of zinc provides good removal performance, the pure zinc coating wears however so quickly that it is completely used up before the erosion wire emerges from the cutting gap of a moderately high workpiece, so that eventually, the electrode cuts with the core material. This results in the cutting performance of the electrode being altogether considerably reduced.

For this reason it is known (EP 0 312 674) to provide a β-sheath coating which, while in theory, due to the reduced zinc content, is said to have a lesser cutting performance than a pure zinc sheath coating, but which due to its far lower rate of wear in the practical cutting process provides a better cutting performance already at low workpiece heights.

Furthermore, from DE 195 10 740 A1 it is known to produce the sheath coating from a γ-brass, which leads to an increased removal performance being achieved because the zinc fraction in the γ-brass is higher than it is in the β-brass. Practical operation shows however, that this γ-coating wears far more quickly than does a β-sheath coating, so that the advantages are noticeable only in the case of low workpiece heights.

Furthermore, from DE 199 13 694 A1, the manufacture of a wire electrode comprising two sheath coatings, one on top of the other, is known, wherein the lower sheath coating comprises a β-brass while the upper sheath coating comprises pure zinc or a zinc alloy comprising in excess of 80% zinc. This electrode is a so-called combination electrode which is equally suitable for high-speed cutting and for fine cutting where rapid wear of the sheath coating is less important. If such an electrode is used for high-speed cutting, then in this method, the outer sheath coating which comprises zinc and which wears rapidly, may improve the ignition behaviour of the electrode, while the actual erosion process takes place by means of the β-sheath coating. By contrast, if this electrode is used for fine cutting, only the outer sheath coating is consumed while the underlying β-sheath coating remains. This electrode provides an advantage in that it is possible with one and the same wire electrode, i.e. without any set-up time, to carry out high-speed cutting as well as fine cutting where it is important to achieve an extremely smooth surface.

It is the object of the invention to propose an electrode for high-speed cutting which when compared to an electrode comprising a β-sheath coating and when compared to an electrode comprising a γ-sheath coating, features a better cutting performance and moreover comparatively less wear.

According to the invention, this object is met in that the inner sheath coating predominantly comprises β-brass, while the outer sheath coating predominantly comprises γ-brass, wherein the fraction of β/β'-phase or γ-phase in the two sheath coatings is at least 60%, and wherein the ratio of the coating thickness of β-brass to γ-brass is between 0.3 and 7, and the sum of the thicknesses of both sheath coatings in relation to the external diameter of the electrode is between 0.1 and 0.3.

Surprisingly, the combination of an underlying β-sheath coating with an overlying γ-sheath coating leads to a cutting performance which is better than that which can be achieved with a pure γ-sheath coating or with a pure β-sheath coating.

Figure 2:
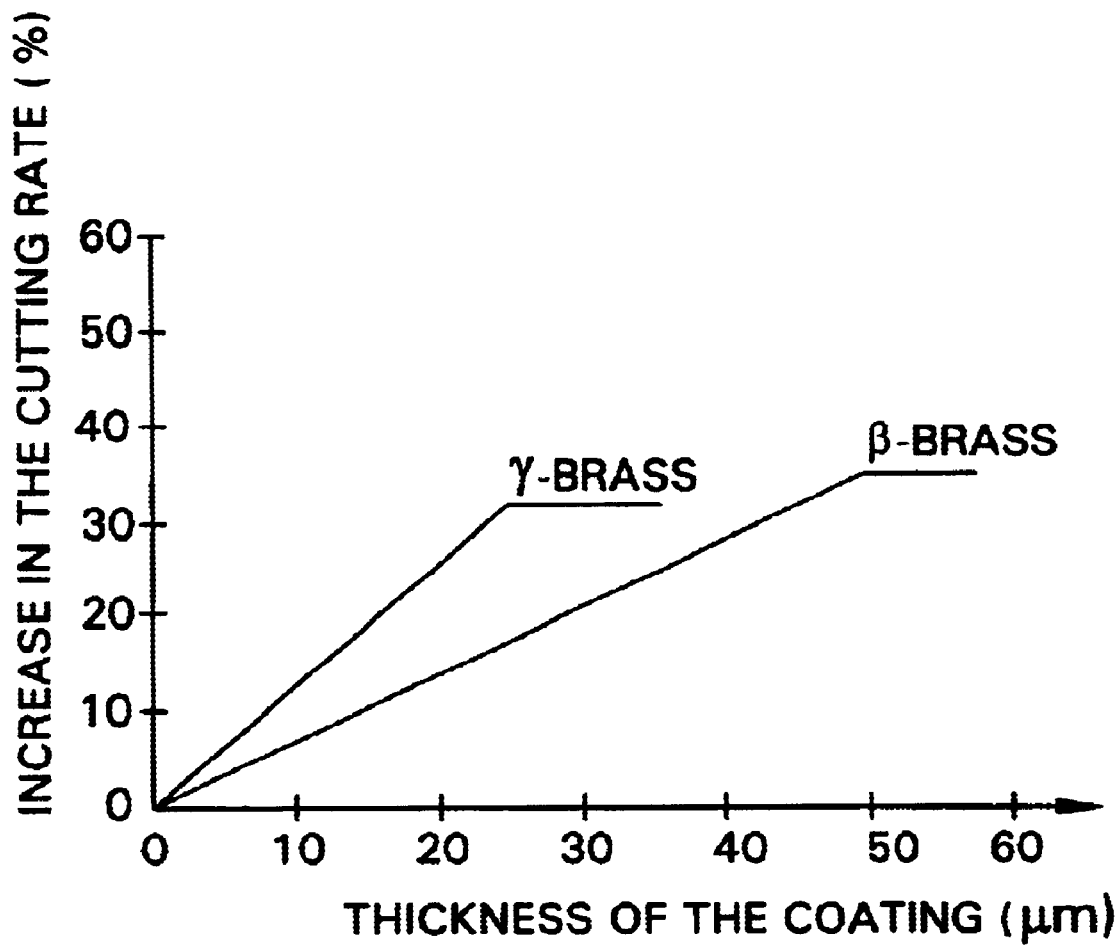
Figure 3:
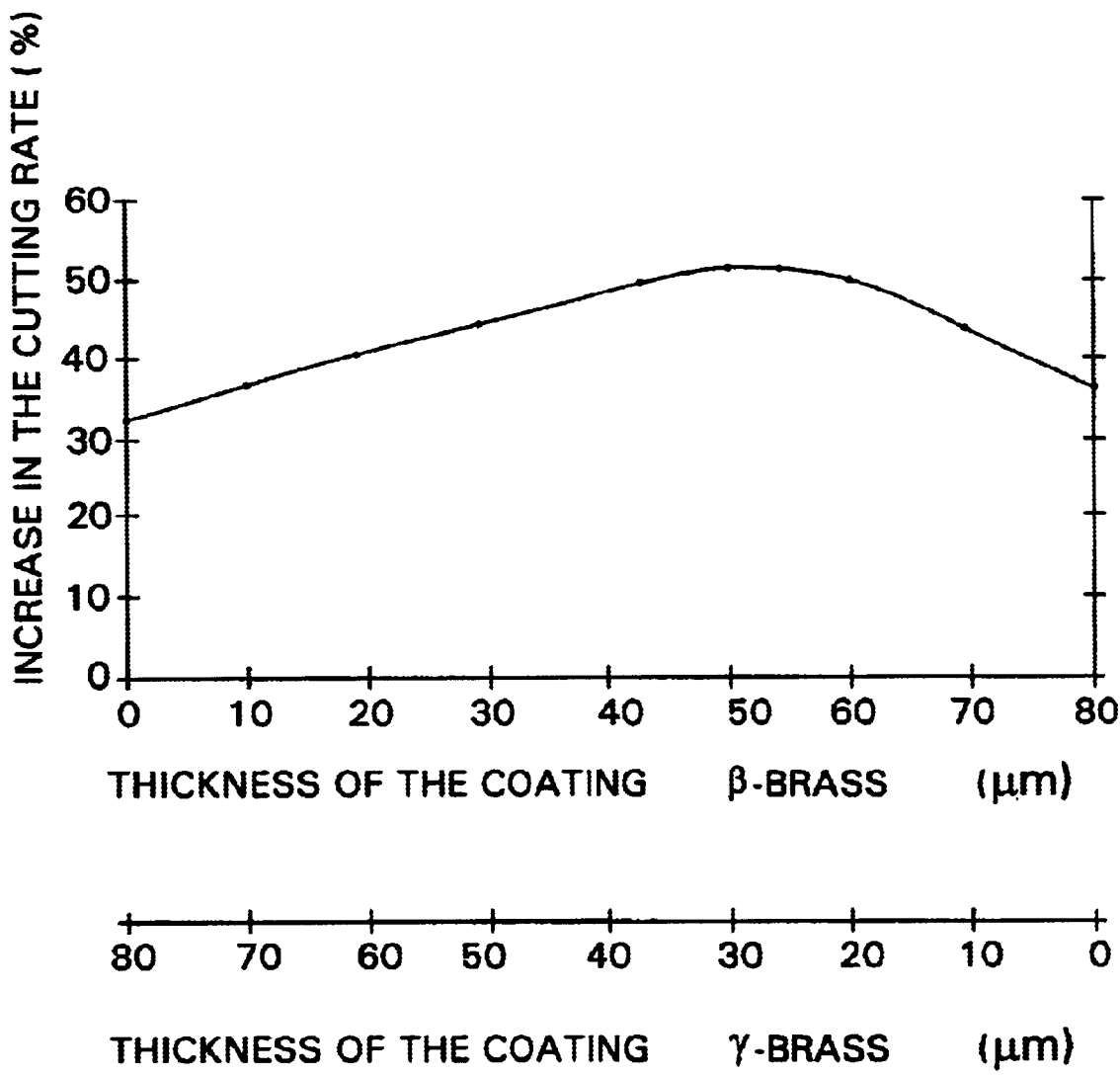

Below, an embodiment of the invention is described in more detail by means of the drawing showing the following:

FIG. 1 a cross-section through a wire electrode according to the invention;

FIG. 2 a diagram of the increase in the cutting rate depending on the thickness of the coating of β-brass and γ-brass; and FIG. 3 a diagram of the increase in the cutting rate, depending on the combination of a γ-sheath coating and a β-sheath coating according to the invention.

FIG. 3 shows the increase in the cutting rate in the erosion electrode according to the invention according to FIG. 1, wherein the wire diameter was 0.3 mm and the wire run-off speed was 12 m/min. In this example a workpiece was cut from a X210Cr12 steel, with a workpiece height of 50 mm.

On the abscissa of the diagram in FIG. 2, the thickness of the coating was applied in $\mu$m, once in relation to a γ-sheath coating 3, and once in relation to a β-sheath coating 2 which was applied to a wire electrode as the only coating. In the given parameters it has been shown that with the use of a γ-sheath coating, the increase in the cutting rate for the specific workpiece with increasing thickness of the coating of the γ-brass is considerably greater than it is in the case of a β-brass coating. However, it has also been shown that in the case of an increase in the thickness of the coating from approximately 25 $\mu$m in the case of a γ-brass, it was no longer possible to obtain an increase in the cutting rate. Instead, the cutting rate remained constant which indicates that even after exiting from the cutting gap, the remaining sheath coating still fully comprised γ-brass. However, due to excessive contamination of the cutting gap, the process became increasingly unstable and the cutting rate remained constant at first. The same tests involving a sheath coating comprising β-brass showed that with a growing sheath coating, the increase in the cutting rate takes place considerably more slowly, however, that in the final analysis at approx. 50 $\mu$m, a maximum increase in the cutting rate is obtained, with said maximum increase in the cutting rate being above that of γ-brass. Here too, a further increase in the sheath coating did not result in a further increase in the cutting rate.

With a combination according to the invention, of a β-sheath coating with a γ-sheath coating, overall, a cutting rate was achieved which is approximately 30% above the maximum cutting rate of the individual components. In order to achieve the maximum cutting rate, it is crucial that the thicknesses of the individual sheath coatings are in a particular ratio in relation to each other, and that the sheath coating as such, too, is in a particular ratio to the diameter of the wire electrode.

The best results, i.e. the largest percentage increase, are achieved if the ratio of the thickness of the coating of β-brass to γ-brass is between 1.3 and 3, wherein the β-brass as well as the γ-brass each comprises at least 90% β-phase or γ-phase, wherein it is also ensured that the distribution of the γ-brass and the β-brass respectively, is essentially constant across the thickness of the sheath coating. Of course, transition zones between the γ-brass and the β-brass, and the β-brass and the centre 1, are formed, with the fractions of the γ-phase or of the β-phase reducing accordingly. However, such transition zones are small in relation to the remaining thickness of the respective sheath coating.

Either a homogenous copper centre or a homogenous brass alloy can be used as the centre 1 of a wire electrode according to the invention. In a similar way, composite centres may also be used. It has been shown to be advantageous if a steel core is used as the centre, which steel core is surrounded by a copper coating or a brass coating so as to improve conductivity.

At low temperature, the β-phase of the β-brass coating has an ordered lattice with defined lattice locations for the copper and zinc. By contrast, if a certain temperature is exceeded, this ordered structure changes to a random structure. Since the transition of the random β-phase to the ordered β'-phase according to present opinion cannot be suppressed and has only a slight effect, both concerning its mechanical and electrical characteristics, we have only mentioned the β-phase in the above text.

What is claimed is:

1. A wire electrode for spark erosion cutting of metals, electrically-conducting ceramics, comprising either a homogenous centre (1) made of a metal or of a metal alloy, or a composite centre, and comprising at least two sheath coatings made of Zn alloys, with said coatings wearing during erosion, characterised in that
    the inner sheath coating (2) predominantly comprises β-brass, while the outer sheath coating (3) predominantly comprises γ-brass, wherein the fraction of β/β'-phase or γ-phase in the two sheath coatings is at least 60%, and wherein the ratio of the coating thickness of β-brass to γ-brass is between 0.3 and 7, and the sum of the thicknesses of both sheath coatings in relation to the external diameter of the electrode is between 0.1 and 0.3.

2. The wire electrode according to claim 1, characterised in that the ratio of the coating thickness of β-brass to γ-brass is between 0.7 and 5.

3. The wire electrode according to claim 1, characterised in that the ratio of the thickness of the coating of β-brass to γ-brass is between 1.3 and 3.

4. The wire electrode according to claim 1, characterized in that the β-brass sheath coating comprising at least 90% β/β'-phase.

5. The wire electrode according to claim 1, characterised in that the βsheath coating comprises at least 90% γ-phase.

6. The wire electrode according to claim 1, characterised in that the centre comprises copper, brass or a composite centre with a steel core comprising a copper coating or brass coating.

7. The wire electrode according to claim 1, characterised in that the γ-brase coating is at least 1 μm thick.

8. The wire electrode according to claim 1, characterized in that the β-brass coating is at least 10 μm thick.

9. The wire electrode according to claim 1, characterized in that the γ-brass coating is at least 25 μm thick.

10. The tire electrode according to claim 1, characterised in that the β-brass coating is at least 50 μm thick.

* * * * *

UNITED STATES PATENT AND TRADEMARK OFFICE
CERTIFICATE OF CORRECTION

PATENT NO. : 6,781,081 B2
DATED : August 24, 2004
INVENTOR(S) : Heinrich Groos et al.

It is certified that error appears in the above-identified patent and that said Letters Patent is hereby corrected as shown below:

Column 4,
Line 17, change "that the βsheath coating" to -- that the γ-brass sheath coating --.
Line 23, change "that the γ-brase coating" to -- that the γ-brass coating --.
Lines 24 and 26, change "characterized" to -- characterised --.
Line 28, change "The tire electrode" to -- The wire electrode --.

Signed and Sealed this

Twenty-second Day of March, 2005

JON W. DUDAS
*Director of the United States Patent and Trademark Office*